United States Patent [19]

Williams, Jr.

[11] Patent Number: 4,759,564
[45] Date of Patent: Jul. 26, 1988

[54] ADJUSTABLE LEVELING DEVICE FOR AUTOMATIC TRAILER HITCH

[76] Inventor: Thomas M. Williams, Jr., Rte. 8, Box 414, Durham, N.C. 27704

[21] Appl. No.: 28,223

[22] Filed: Mar. 20, 1987

[51] Int. Cl.$^4$ .............................................. B62D 1/16
[52] U.S. Cl. ................................ 280/478 B; 280/477; 280/508
[58] Field of Search ............... 280/508, 510, 511, 477, 280/478 B, 478 R; 16/304, 305, 306, 307

[56] References Cited

U.S. PATENT DOCUMENTS 2,538,372  1/1951  Light ..................................... 16/305
4,560,184  12/1985  Williams .............................. 280/508

Primary Examiner—John J. Love
Assistant Examiner—Donn McGiehan
Attorney, Agent, or Firm—B. B. Olive

[57] ABSTRACT

An automatic trailer hitch assembly mounts a shank unit on the trailer and a receiving unit on the towing vehicle. The shank unit provides an elongated shank member which mounts the trailer ball at one end coupled to a conventional trailer hitch ball socket housing secured to the trailer and at the opposite end is formed to slide on funnel-like guide passages into the receiving unit. A spring leveler assembly is detachably and adjustably secured as a subassembly to the trailing end of the shank unit, releasably grasps the ball socket housing and retains the shank unit properly positioned for coupling.

6 Claims, 3 Drawing Sheets

ADJUSTABLE LEVELING DEVICE FOR AUTOMATIC TRAILER HITCH

TECHNICAL FIELD

The present invention relates to trailer hitches and particularly to a trailer hitch which automatically couples a recreational or other type trailer to its towing vehicle.

BACKGROUND ART

The background art is believed to be fully and adequately disclosed in my prior U.S. Pat. Nos. 4,560,184, 4,613,149, and 4,606,549, each of which deals with an automatic trailer hitch. Therefore, the details of the background art as found in my prior patents will not be repeated here. As has been pointed out in the prior patents, the provision of an improved automatic trailer hitch has revealed a continuing need for reducing the number of components required, simplifying the manufacture and making the hitch even more versatile with respect to the various types of hitch configurations required for the many types of towing situations.

My prior patents all disclose variations of an improved automatic trailer hitch comprising a shank unit which extends from the towed vehicle's trailer hitch ball socket housing. Such improved automatic trailer hitch also comprises a receiving unit on the towing vehicle which automatically latches during a coupling operation. A leveler assembly on the shank unit positions the shank unit for coupling.

With continuing experience, it has been found desirable and possible to even further improve the shank unit by reducing the number of parts in the leveler assembly and making it more adjustable. Thus, the present invention in the context of the trailer hitches of my prior patents is aimed primarily at improving the leveler assembly.

DISCLOSURE OF INVENTION

The improved leveler assembly of the invention taken in the context of the automatic trailer hitches of my prior patents incorporates a wire-formed spring member pivotally and adjustably positioned on the trailing end of the shank unit and operative for releasably supporting the shank unit during coupling by grasping the forward ledge portion of the ball socket housing. In one embodiment, the spring member is releasably and adjustably positioned on the trailing end of the shank unit itself. In another embodiment, the spring member is releasably and adjustably positioned on a plate member which is secured by the ball stud which is in turn secured to the trailing end of the shank unit. The shank unit leveling mechanism now possesses a resilient character but with sufficient rigidity to perform its releasable support function. The wire-formed spring member also provides by reason of its adjustable mounting a wide range of adjustability beyond the range heretofore achieved.

BEST MODE FOR CARRYING OUT THE INVENTION

Figure 1:
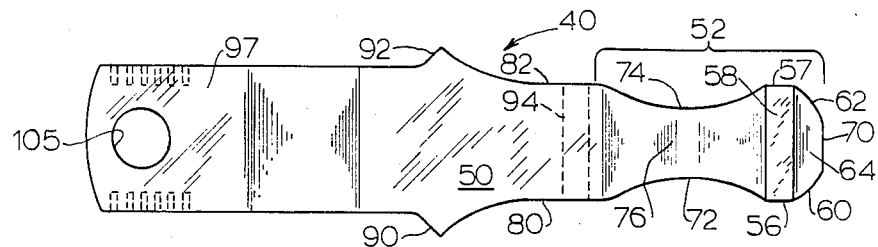
FIG. 1 is a top plan view of an improved shank unit employed in the apparatus of the invention according to a first embodiment.
Figure 2:
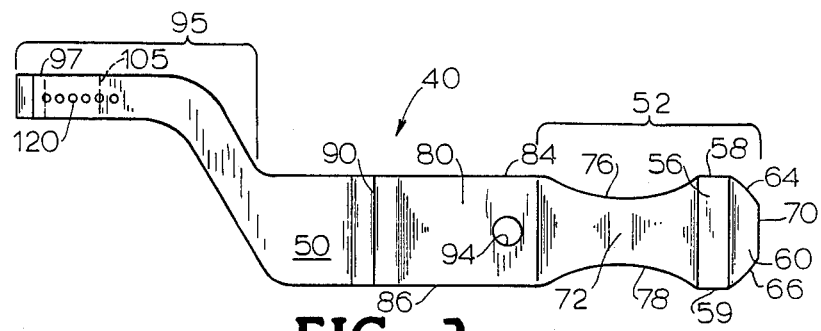
FIG. 2 is a side elevation view of the shank unit of FIG. 1.
Figure 3:
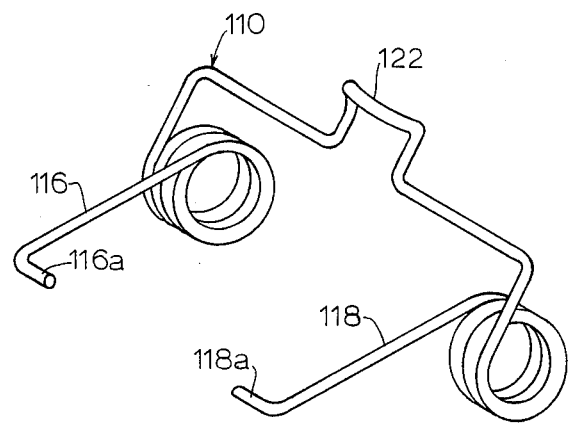
FIG. 3 is a perspective view of a self-leveling spring employed with the shank unit of FIG. 1.

As has already been mentioned, the present invention is directed primarily to improvements in the shank unit, therefore only brief reference will be made to the receiving unit.

Making reference initially to FIGS. 1-7, the adjustable self-leveling automatic trailer hitch, generally designated 30, with which the improved shank unit of the invention is associated, comprises a funnel-shaped receiving unit 35 fixedly attached to a towing vehicle such as a truck, automobile, or the like, and the improved shank unit 40 of the invention coupled to a conventional ball socket housing 42 mounted on a towed vehicle such as a recreational boat trailer. Neither the towing vehicle nor the towed vehicle is illustrated for simplification of the drawings. While not illustrated, means are provided for attaching receiving unit 35 to the frame of the towing vehicle. Additional holes 39 enable a bumper bracket, not shown, or the like to be used for additional securement of receiving unit 35 to the towing vehicle. Holes 34 (FIG. 4) receive safety chains. It may be assumed for purposes of the description that the receiving unit 35 is suitably attached to the towing vehicle and that the particular towed vehicle employed mounts the improved shank unit 40 as illustrated. It may also be assumed that the receiving unit 35 is generally of one of the constructions previously described in my prior patents. In use, the uncoupled receiving unit 35 and the improved shank unit 40 of the invention are adapted to be automatically coupled when the towing vehicle is driven rearwardly to bring the receiving unit 35 into coupling relation with the improved shank unit 40 as more fully explained in my prior patents.

The improved shank unit 40 of the invention according to the first embodiment comprises an elongated, solid steel cast shank 50 formed at its forward end with a probe portion 52 having flat, narrow width, right and left side guide surfaces 56, 57, flat, narrow width, top and bottom guide surfaces 58 and 59, leading and inwardly-angled, flat, right and left side surfaces 60, 62, leading and inwardly angled top and bottom flat surfaces 64, 66, and a flat vertical nose surface 70. Inwardly curved right and left trailing side surfaces 72, 74 and inwardly curved top and bottom side surfaces 76, 78 merge into the respective right and left side surfaces 80, 82 and top and bottom surfaces 84, 86 of shank 50 which is generally of square cross-section. Such arrangement of surfaces facilitates entry of probe portion 52 into receiver unit 35 (FIGS. 4 and 5) and also prevents any tendency for shank 50 to rotate around its axis within receiving unit 35. Receiving unit 35 provides a comparable and mating internal square cross-sectional shape as previously described in my prior patents.

Shank 50 includes a pair of integrally molded stop blocks 90, 92 which serve both to limit the extent of entry of shank 50 into receiving unit 35 and also to accept forces imposed on the hitch during braking of the towing vehicle. The position of stop blocks 90, 92 are also selected to insure that shank 50, when fully entered into receiving unit 35 is located in a proper pin-receiving position for coupling. The vertically-disposed side surfaces 80, 82 and horizontally-disposed top and bottom surfaces, 84, 86 forward of integral blocks 90, 92 smoothy merge into respective curved surfaces 72, 74 and 76, 78 to further facilitate entry of the improved shank unit 40 into and withdrawal from the receiving unit 35. A pin-receiving hole 94 having a tapered entrance passes through the width of shank 50 for receiving and guiding the tapered end of a locking pin (not shown) when the improved shank unit 40 is fully inserted into the receiver unit 35 as more fully described in my prior patents.

The trailing end of shank 50 is formed as a bent metal ball support portion 95 and mounts on platform portion 97 utilizing hole 105 a conventional metal trailer hitch ball 96 of some selected size by means of its integral ball mount 98, nut 100 and lock washer 102 secured on the threaded stud 104. Ball 96 is selected to be of the same size as the socket size of the conventional metal-formed ball socket housing 42 into which the ball 96 is received.

Figure 4:
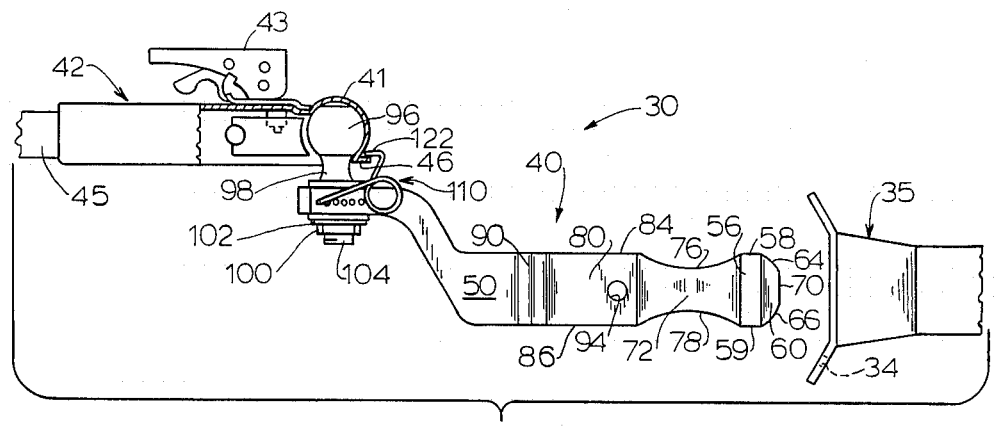
FIG. 4 is a side elevation view of a partial trailer tongue with an associated trailer hitch ball socket housing assembled with the shank unit of FIG. 1 and shown supported in a horizontal position for coupling to the partially illustrated receiving unit.

Ball 96 of the improved shank unit 40 of the invention mates with and is loosely received by the socket 41 of the ball socket housing 42 and is retained therein by means of a conventional ball latch 43 as in FIG. 4. Ball socket housing 42 mounts on the end of the trailer tongue 45 as further illustrated in FIGS. 4-5 and is characterized by having a forwardly extending substantially flat lip or ledge 46. The invention leveler spring 110 utilizes ledge 46 as a clamping ledge for supporting shank unit 40 horizontally prior to coupling utilizing the weight of the outwardly extending shank unit 40 as the clamping force and during which ball 96 is substantially relieved of the shank unit weight.

The integrally-formed leveler spring 110 is designed to pivotally mount on the ball support platform 97 by means of a pair of laterally-spaced and opposing arms 116, 118 with respective inwardly directed end portions 116a, 118a designed to be inserted in a selected pair of holes 120 formed on opposite sides of the platform portion 97 of shank unit 40. Leveler spring 110 is formed of relatively stiff steel wire rod with a stiffness selected to allow the end portions 116a, 118a to be spread apart for insertion into a selected pair of the holes 120 suited by location to the particular type of trailer hitch being coupled. Leveler spring 110 includes a formed bent portion 122 between spring coils 124, 126 and which is adapted to releasably grasp the leading front end of ledge 46 of the metal ball socket housing 42 so as to support the weight of the entire shank unit 40 during coupling.

Figure 5:
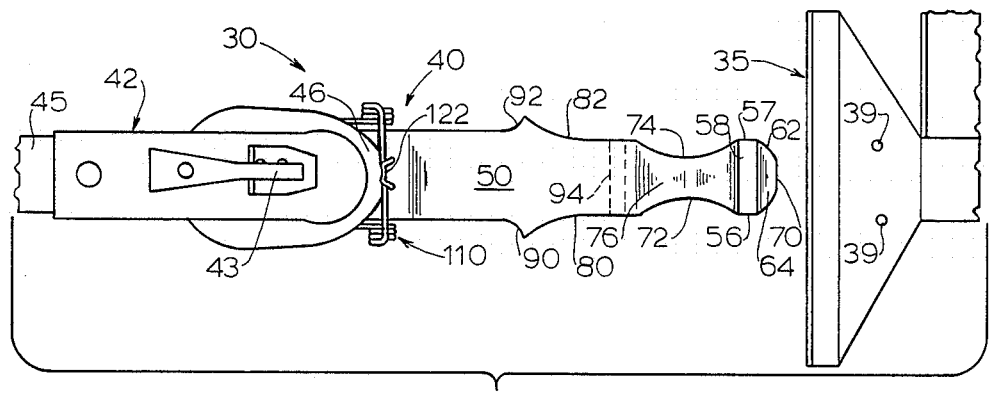
FIG. 5 is a top plan view of the assembly of FIG. 4.
Figure 6:
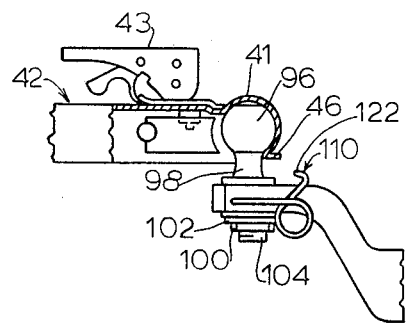
FIG. 6 is a fragmentary side elevation view of the coupled trailer hitch ball socket housing and shank unit of FIG. 4 but with the self-leveling spring disengaged for travel.
Figure 7:
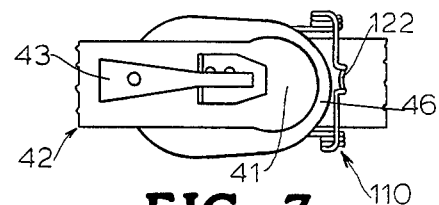
FIG. 7 is a top plan view of the assembly of FIG. 6.

From the foregoing description, it will be seen that the leveler spring 110 once installed on the ball support platform 97 of shank 50 and as illustrated in FIGS. 4 and 5 effectively supports the improved shank unit 40 horizontally to facilitate coupling by using the weight of the outwardly extending shank unit as a clamping force. With ball 96 locked in ball socket 41 as in FIG. 4, the grasp portion 122 of leveler spring 110 readily adapts to engaging the ledge 46 of the ball socket housing 42 so as to use the weight of the shank unit 40 to maintain shank unit 40 horizontal or substantially horizontal depending on the adjustable location of the leveler spring 110 on the ball platform portion 97 of shank unit 40. It will also be seen that the leveler spring 110 can be quickly removed and replaced or moved to a new position simply by spreading apart the leg portions 116, 118 as required. The arrangement of leveler spring 110 on shank unit 40 also insures that the shank unit 40, if not precisely aligned with the receiving unit 35, can move to the right, to the left, up or down, while achieving the coupling operation. Further, after completion of the coupling operation the leveler spring 110 tends to automatically release itself and assume the position illustrated in FIG. 6 during travel. What is particularly advantageous is that the leveler assembly has been reduced to the single spring component comprising leveler spring 110 thus substantially reducing the number of parts as compared to the leveler assemblies disclosed in my prior patents. There is also provided improved ease of adjustment as well as ease of removal and replacement. It should also be understood that the improved shank unit 40 of the invention can be inverted from the position depicted in FIGS. 2 and 4 so as to locate the ball platform portion 97 at a lower level when desired.

Figure 9:
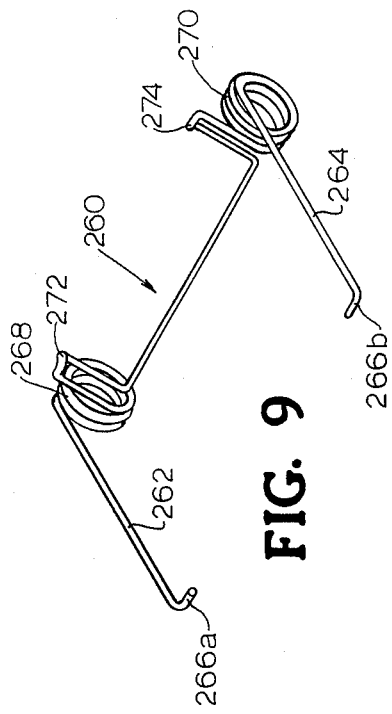
FIG. 9 is a perspective view of a third embodiment self-leveling spring for use with the heavy duty hitch shank unit of FIG. 8 when coupled to a trailer hitch ball socket housing having a raised lip.
Figure 8:
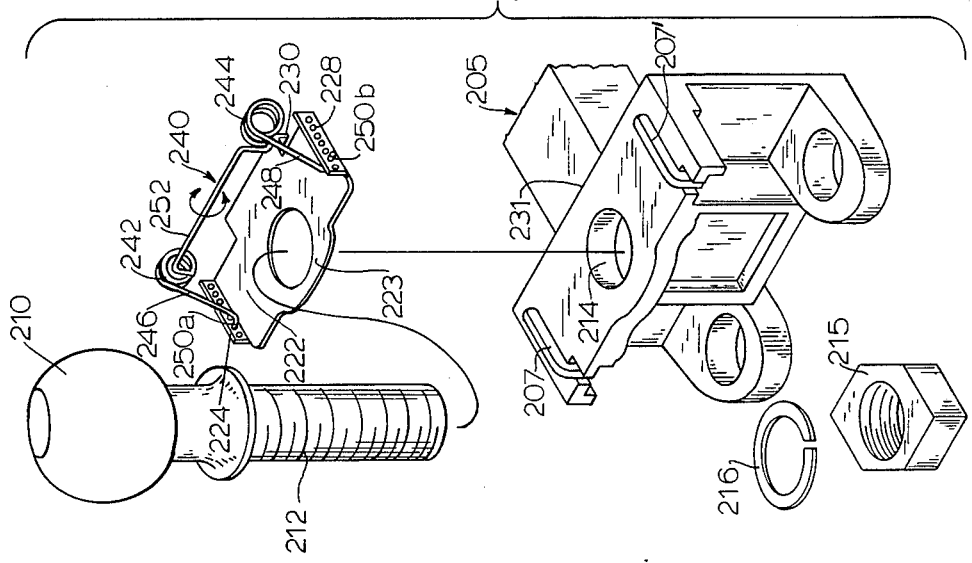
FIG. 8 is an exploded view of a second embodiment leveler subassembly for a heavy duty type hitch utilizing a removable plate member in conjunction with a second embodiment self-leveling spring for use with a trailer hitch ball socket housing having a flat lip.

FIG. 8 illustrates in an exploded view a heavy duty type hitch modified according to the invention. The heavy duty ball 210 mounts on threaded stud 212 secured in hole 214 on hitch member 205 by nut 215 and lock washer 216. The spring leveler assembly in this embodiment includes a plate member 222 with appended, upwardly extending and laterally-spaced flanges 224, 226 formed with sets of opposed holes 228. Hole 223 in plate member 222 mates with hole 214 in hitch member 205. Plate member 222 mounts between the conventional spring bar retainers 207, 207' and is held in a secure, nonshifting position by means of the downwardly turned flange 230 grasping the step 231 typically formed on this type of heavy duty trailer hitch. An integral leveler spring 240 is formed of relatively stiff spring wire and includes a pair of opposed spring coils 242, 244 and a pair of opposed legs 246, 248 formed with respective end portions 250a, 250b received by a selected pair of holes 228 as best seen in FIG. 8. A relatively flat central bar portion 252 is adapted to releasabily grasp the leading front edge of a mating heavy duty type ball socket housing having a flat lip, not shown. From prior description, it will of course be understood that after plate 222 is properly assembled on the heavy duty trailer hitch 205 the opposed legs 246, 248 of leveler spring 240 are spread apart and the end portions 250a, 250b are located in the proper set of opposed holes 228 suited to the particular trailer hitch ball socket housing being coupled. The grasp portion 252 is then properly installed on the appropriate flat lip of the ball socket housing, not shown, so as to operate in the manner previously explained with reference to FIGS. 1-7. Since heavy duty trailer hitches sometime employ ball socket housings in which the forward ledge has an upturned lip rather than a flat lip, there is illustrated in FIG. 9 a modified leveler spring 260 suited to this application. Leveler spring 260 as seen in FIG. 9 includes a pair of opposed arms 262, 264, end portions 266a, 266b received by holes 228 in plate member 222, spring coils 268, 270 and laterally-spaced grasp portions 272, 274 formed so as to grasp the upturned lip type heavy duty trailer hitch ball socket housing, not shown. Leveler spring 260 in this third embodiment is formed from relatively rigid spring steel wire as with the other leveler springs previously described. In use, leveler spring 260 utilizes the illustrated grasps 272, 275 to grasp the leading upturned lip edges of the heavy duty hitch ball socket housing but otherwise operates in the manner previously explained. What is particularly advantageous with respect to the heavy duty hitch application as with the light duty hitch application is that the number of parts required for the leveler assembly have been reduced while at the same time providing economy in manufacture and ease of adjustment and replacement suited to the various heavy duty trailer hitch applications normally encountered in practice. All of the advantages listed in my prior U.S. Pat. No. 4,613,149 have been retained while providing the additional advantages of simplified construction and ease of adjustment.

What is claimed is:

1. In an automatic trailer hitch assembly for use with a towing vehicle and a towed trailer or other towed vehicle having a metal-formed housing with a ball socket at its towing end and of the type having an elongated shank unit on the towed vehicle and a receiving unit on the towing vehicle providing a bore for receiving a predetermined length of the shank unit and a mechanism for locking the shank unit and receiving unit together once coupled, the improvement comprising:
   (a) an elongated shank unit on the towed vehicle, said shank unit extending between leading and trailing ends and including:
      (i) at the trailing end a ball member supported on a threaded stud secured to said trailing end and releasibly coupled in the ball socket of said housing;
      (ii) at the leading end curved surfaces facilitating the guidance of said leading end when in contact with guide surfaces;
      (iii) structure located at said trailing end providing a plurality of opposed sets of holes on opposite sides thereof; and
      (iv) leveling means mounted on said trailing end comprising;
         (aa) an integral wire formed spring having a pair of opposed legs with inwardly-turned end portions adapted to be releasably and pivotally received by a selected opposed set of said holes and outwardly from said legs a grasp portion operative for resiliently and slidably grasping a selected portion of said housing to support said elongated shank unit appropriately positioned for coupling to a receiving unit; and
         (bb) said spring being formed to allow said grasp portion to disengage during travel.

2. An automatic trailer hitch assembly as claimed in claim 1, wherein said shank unit is formed of solid metal and said structure comprises the trailing end of said shank unit with said holes being formed on the sides thereof.

3. An automatic trailer hitch assembly as claimed in claim 1, wherein said structure includes a plate member having a pair of opposed upturned edges formed with said holes and secured by said ball member.

4. An automatic trailer hitch assembly as claimed in claim 3, wherein said leveler spring grasp portion is formed for grasping a flat lip of a trailer hitch ball socket housing.

5. An automatic trailer hitch assembly as claimed in claim 3, wherein said leveler spring is formed for grasping an upturned lip of a trailer hitch ball socket housing.

6. In an automatic trailer hitch assembly for use with a towing vehicle and a towed trailer or othere towed vehicle having a metal-formed housing with a ball socket at its towing end and of the type having an elongated shank unit on the towed vehicle and a receiving unit on the towing vehicle providing a bore for receiving a predetermined length of the shank unit and a mechanism for locking the shank unit and receiving unit together once coupled, the improvement comprising:
   (a) said shank unit extending between leading and trailing ends and including:
      (i) at the trailing end a ball member supported on a threaded stud secured to said trailing end and releasably coupled in the ball socket of said housing;
      (ii) at the leading end curved surfaces facilitating the guidance of said leading end with in contact with guide surfaces;
      (iii) an integral spring having a first portion formed to releasbly and slidably grasp a selected portion of said housing, a second portion having end portions releasably supported on said trailing end and third portion between and resiliently connecting said first and second portions; and
      (iv) said spring being operative by itself in conjunction with support provided by said ball to support the weight of said shank unit in a position suited to coupling with the receiving unit.

* * * * *

UNITED STATES PATENT AND TRADEMARK OFFICE
CERTIFICATE OF CORRECTION

PATENT NO. : 4,759,564

DATED : July 26, 1988

INVENTOR(S) : Thomas M. Williams, Jr.

It is certified that error appears in the above-identified patent and that said Letters Patent is hereby corrected as shown below:

Column 6, line 42, correct "with" to read --when--.

Signed and Sealed this

Twenty-ninth Day of November, 1988

Attest:

DONALD J. QUIGG

Attesting Officer     Commissioner of Patents and Trademarks